(12) United States Patent
Abedini et al.

(10) Patent No.: US 12,256,324 B2
(45) Date of Patent: Mar. 18, 2025

(54) TARGET CELL SELECTION OF AUTONOMOUS MOBILE REPEATERS

(71) Applicant: QUALCOMM Incorporated, San Diego, CA (US)

(72) Inventors: Navid Abedini, Basking Ridge, NJ (US); Kapil Gulati, Belle Mead, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

(21) Appl. No.: 17/403,452

(22) Filed: Aug. 16, 2021

(65) Prior Publication Data

US 2023/0050960 A1 Feb. 16, 2023

(51) Int. Cl.
*H04W 48/20* (2009.01)
*H04W 8/08* (2009.01)
*H04W 24/10* (2009.01)
*H04W 74/0833* (2024.01)

(52) U.S. Cl.
CPC ............ *H04W 48/20* (2013.01); *H04W 8/08* (2013.01); *H04W 24/10* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2009/0280738 | A1* | 11/2009 | Kim | H04J 13/00 455/3.01 |
| 2009/0285182 | A1* | 11/2009 | Zou | H04W 36/0016 370/331 |
| 2010/0061339 | A1* | 3/2010 | Kim | H04W 36/0005 370/331 |
| 2011/0124330 | A1* | 5/2011 | Kojima | H04W 36/32 455/435.2 |
| 2013/0183971 | A1* | 7/2013 | Tamaki | H04W 36/0061 455/436 |
| 2013/0260760 | A1* | 10/2013 | Pan | H04W 36/0009 455/436 |
| 2013/0329629 | A1* | 12/2013 | Bao | H04W 36/00835 370/315 |

(Continued)

FOREIGN PATENT DOCUMENTS

| | | | | |
|---|---|---|---|---|
| EP | 2387279 A1 * | 11/2011 | ............ | H04W 60/04 |
| EP | 2494843 B1 * | 12/2019 | ......... | H04B 7/15528 |

OTHER PUBLICATIONS

International Search Report and Written Opinion—PCT/US2022/074938—ISA/EPO—Jan. 24, 2023.

(Continued)

*Primary Examiner* — Jamaal Henson
(74) *Attorney, Agent, or Firm* — Patterson + Sheridan, L.L.P.

(57) ABSTRACT

Certain aspects of the present disclosure provide techniques for wireless communications by a mobile repeater. The mobile repeater measures broadcast signals from one or more target cells as the mobile repeater moves through a network. The mobile repeater selects one of the target cells, based on the measuring and side information. The mobile repeater forwards signals between a user equipment (UE) and the selected target cell.

25 Claims, 15 Drawing Sheets

(56) References Cited

U.S. PATENT DOCUMENTS

| | | | | |
|---|---|---|---|---|
| 2015/0043422 A1* | 2/2015 | Fujishiro | ........ | H04W 36/008357 |
| | | | | 370/315 |
| 2015/0156708 A1* | 6/2015 | Tietz | .................... | H04W 64/00 |
| | | | | 455/434 |
| 2015/0181498 A1* | 6/2015 | Li | .................... | H04W 36/0016 |
| | | | | 455/437 |
| 2015/0195757 A1* | 7/2015 | Tietz | .................... | H04W 36/08 |
| | | | | 455/438 |
| 2015/0245193 A1* | 8/2015 | Xiong | .................... | H04W 4/80 |
| | | | | 370/328 |
| 2016/0302251 A1* | 10/2016 | Chatterjee | ........... | H04W 36/322 |
| 2018/0124718 A1 | 5/2018 | Ng et al. | | |
| 2021/0259051 A1* | 8/2021 | Latheef | ................. | H04W 76/12 |
| 2023/0089657 A1* | 3/2023 | Ishii | ................. | H04W 36/0079 |

OTHER PUBLICATIONS

Intel Corporation: "Further Details on Service Continuity for Relaying", 3GPP TSG RAN WG2 Meeting #112e, R2-2009271, 3rd Generation Partnership Project (3GPP), Mobile Competence Centre, 650, Route Des Lucioles, F-06921 Sophia-Antipolis Cedex, France, vol. RAN WG2, No. e-Meeting, Nov. 2, 2020-Nov. 13, 2020, 7 Pages, Oct. 23, 2020 (Oct. 23, 2020), XP051942245, section 1.-2.1, pp. 1-2.
Partial International Search Report—PCT/US2022/074938—ISA/EPO—Nov. 25, 2022.

\* cited by examiner

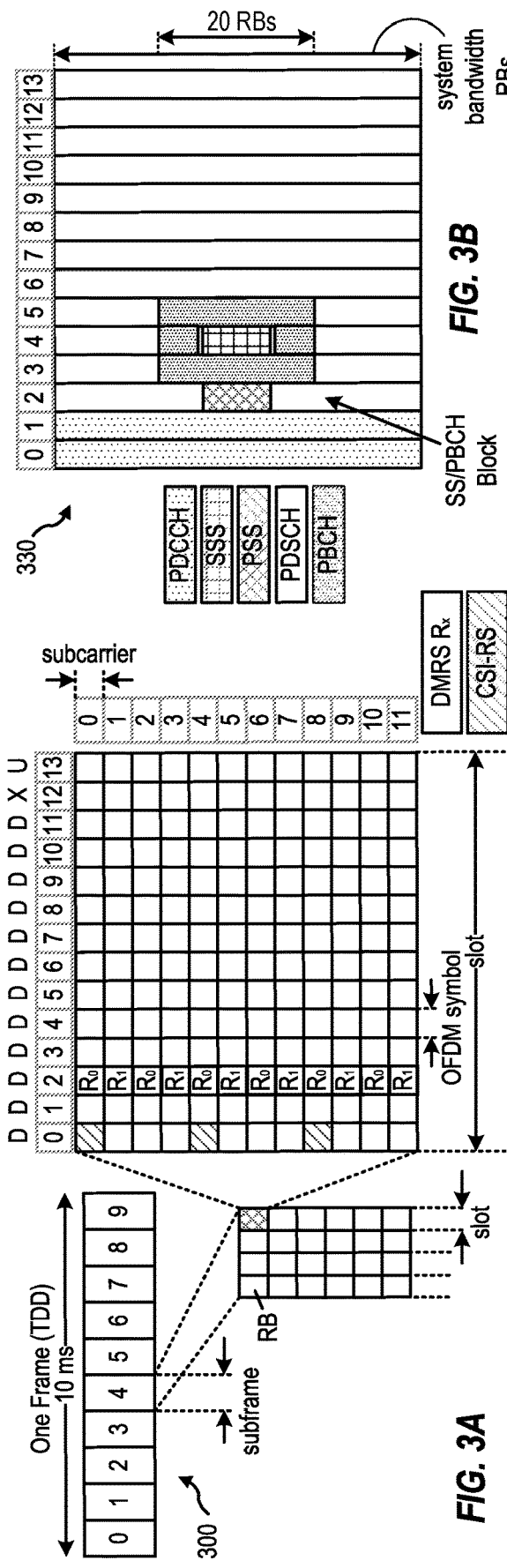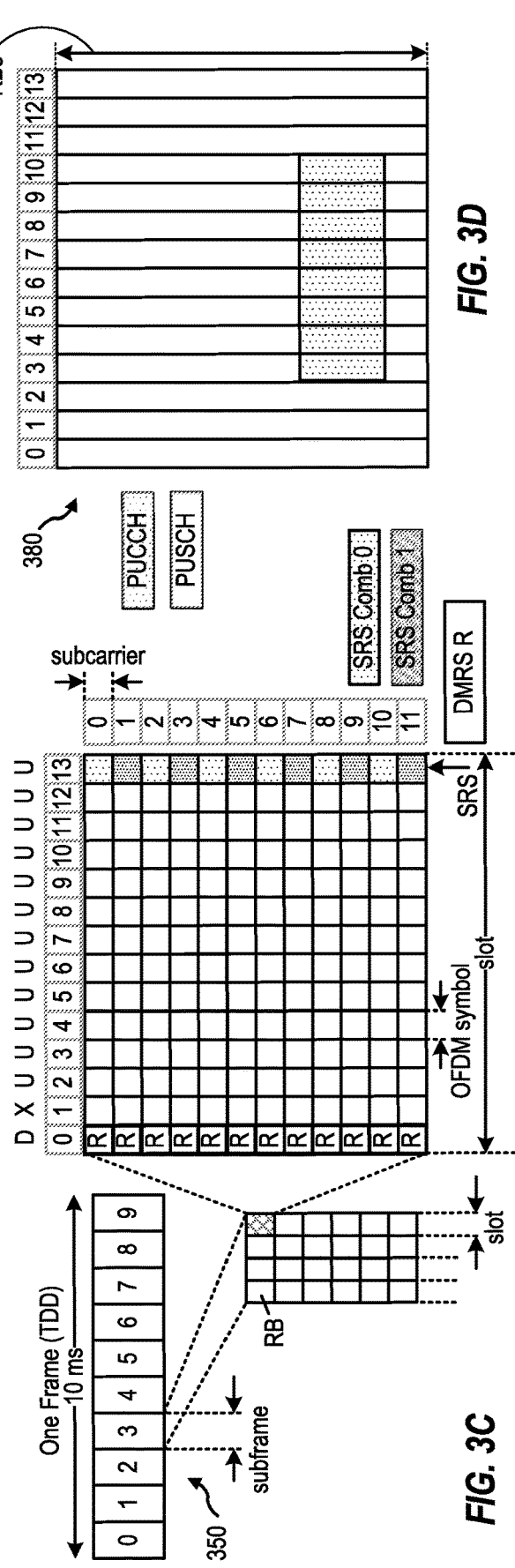

TARGET CELL SELECTION OF AUTONOMOUS MOBILE REPEATERS

INTRODUCTION

Aspects of the present disclosure relate to wireless communications, and more particularly, to techniques for selecting a target cell by a mobile repeater.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a mobile repeater, including: measuring broadcast signals from one or more target cells as the mobile repeater moves through a network; selecting one of the target cells, based on the measuring and side information; and forwarding signals between a user equipment (UE) and the selected target cell.

Another aspect provides a method for wireless communications by a network entity, including: receiving, from a mobile repeater, assistance information related to a mobility of the mobile repeater as the mobile repeater moves through a network; and transmitting side information comprising an indication of at least one target cell, based on the assistance information, to the mobile repeater to establish a connection with the at least one target cell.

Another aspect provides a method for wireless communications by a target cell, including: receiving, from a mobile repeater, an indication that the mobile repeater selected the target cell to establish a connection with the target cell, as the mobile repeater moves through a network; and communicating with a UE via the mobile repeater.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for selecting a target cell by a repeater, such as an autonomous mobile repeater.

As a mobile repeater moves throughout a network, the mobile repeater changes a cell it is associated with in order to provide useful coverage enhancement. In case the mobile repeater can detect multiple neighboring cells, one challenge to address is which cell (or cells) should the mobile repeater select as a target cell for a next association.

Aspects of the present disclosure provide techniques for selecting a target cell based on side information and/or received broadcast signals. The side information may include, for example, a relative mobility of the mobile repeater with respect to the one or more target cells, a number of user equipments (UEs) served by the mobile repeater, and/or access control parameters for the mobile repeater. When an association is made between the mobile repeater and a selected target cell, the mobile repeater may forward signals between the target cell and a UE.

Introduction to Wireless Communication Networks

Figure 1:
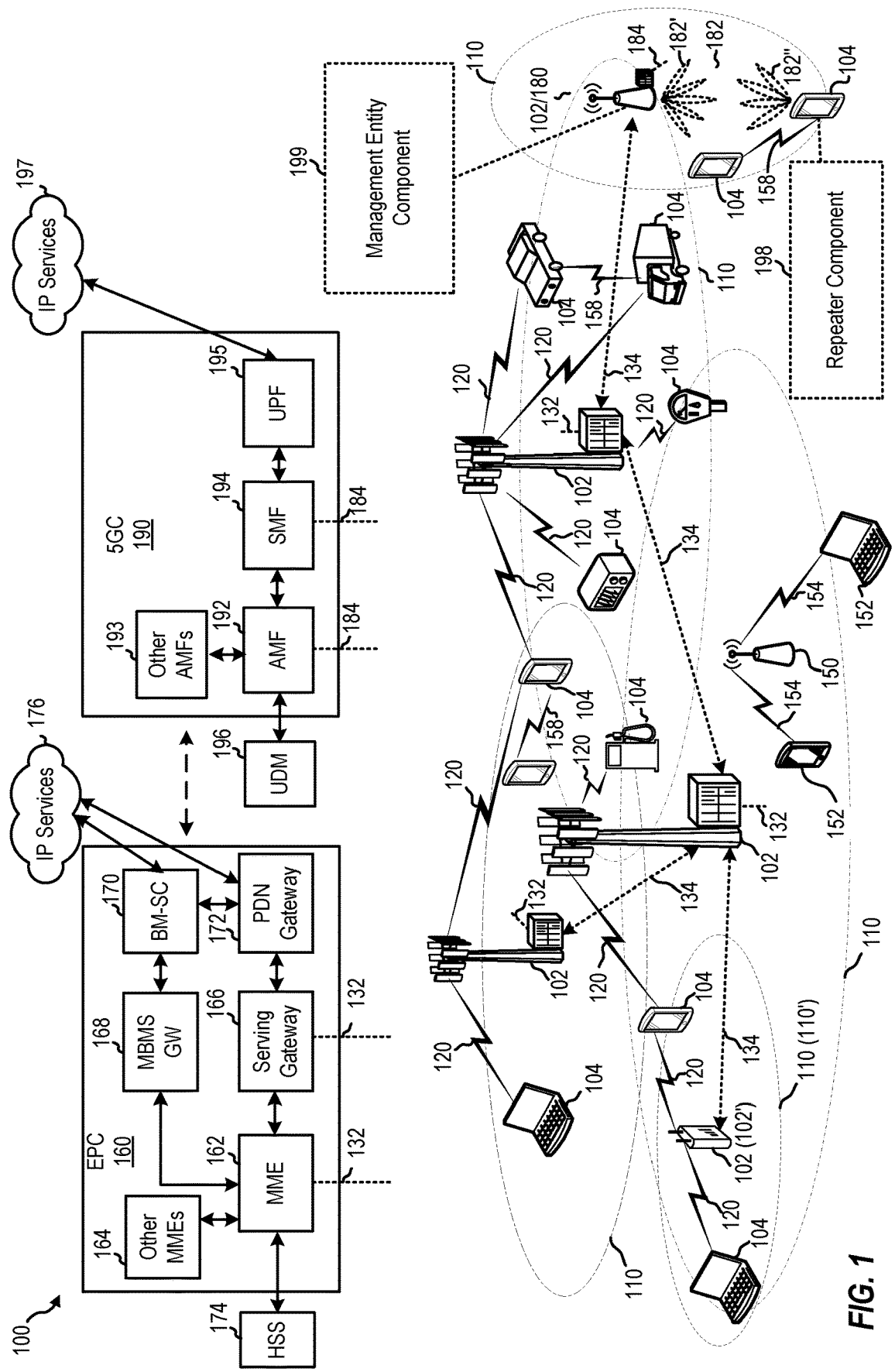
FIG. 1 is a block diagram conceptually illustrating an example wireless communication network.

FIG. 1 depicts an example of a wireless communications system 100, in which aspects described herein may be implemented.

Figure 8:
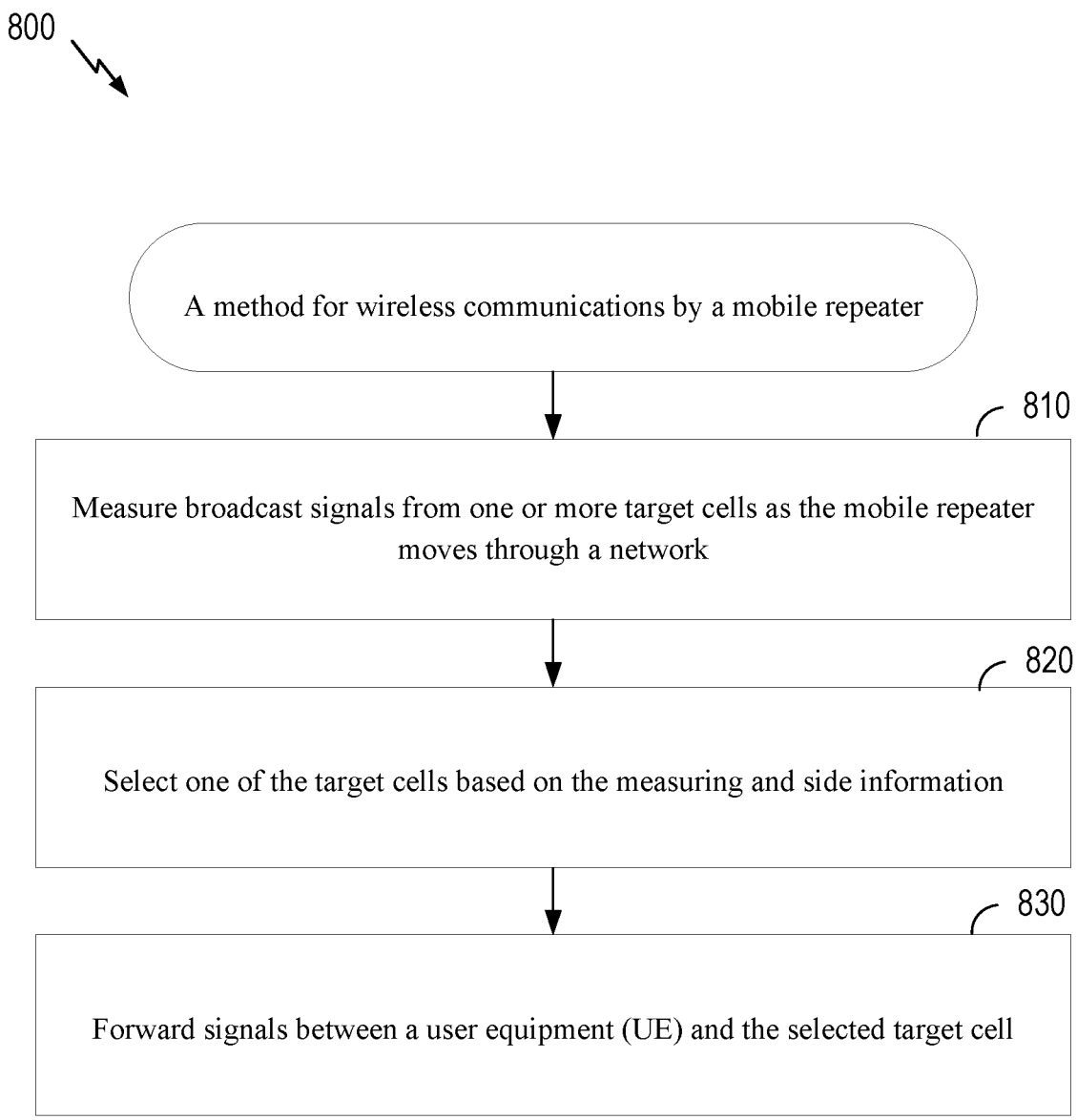
FIG. 8 depicts a flow diagram illustrating example operations for wireless communication by a mobile repeater.
Figure 9:
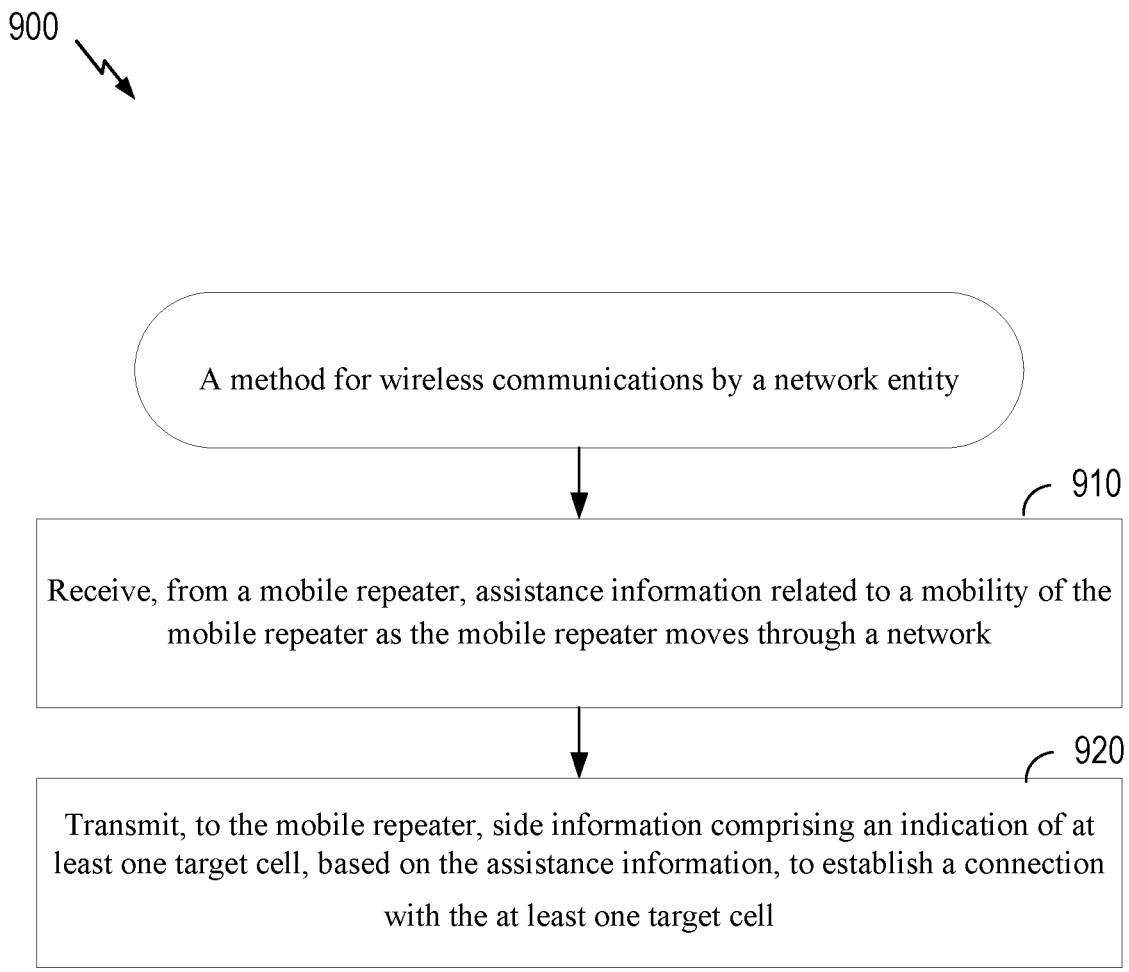
FIG. 9 depicts a flow diagram illustrating example operations for wireless communication by a network entity.

For example, wireless communication system 100 may include a management entity component 199, which may be configured to perform, or cause a base station (BS) 102 to perform, operations 900 of FIG. 9. Wireless communication network 100 may also include a repeater component 198, which may be configured to perform, or cause a user equipment (UE) 104 to perform, operations 800 of FIG. 8.

Generally, wireless communications system 100 includes BSs 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs 102 may utilize beamforming 182 with a UE 104 to improve path loss and range. For example, the BS 102 and the UE 104 may each include a plurality of antennas, such as antenna elements, antenna panels, and/or antenna arrays to facilitate the beamforming.

In some cases, a BS 102 may transmit a beamformed signal to a UE 104 in one or more transmit directions 182'. The UE 104 may receive the beamformed signal from the BS 102 in one or more receive directions 182". The UE 104 may also transmit a beamformed signal to the BS 102 in one or more transmit directions 182". The BS 102 may also receive the beamformed signal from the UE 104 in one or more receive directions 182'. The BS 102 and the UE 104 may then perform beam training to determine the best receive and transmit directions for each of BS 102 and UE 104. Notably, the transmit and receive directions for the BS 102 may or may not be the same. Similarly, the transmit and receive directions for the UE 104 may or may not be the same.

Figure 2:
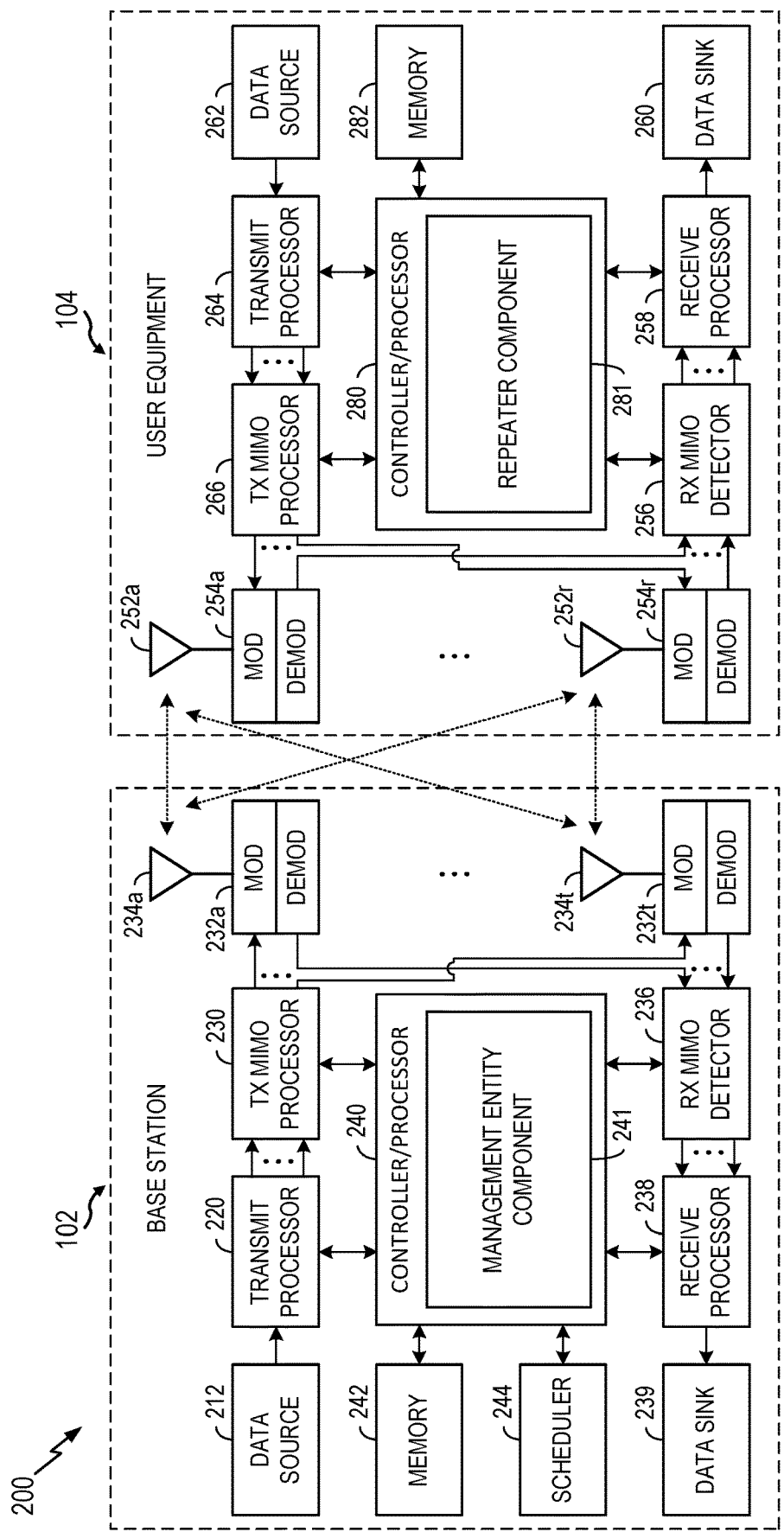
FIG. 2 is a block diagram conceptually illustrating aspects of an example base station (BS) and a user equipment (UE).

FIG. 2 depicts aspects of an example BS 102 and a UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes a management entity component 241, which may be representative of a management entity component 199 of FIG. 1. Notably, while depicted as an aspect of controller/processor 240, the management entity component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

UE 104 includes controller/processor 280, which may be configured to implement various functions related to wireless communications. In the depicted example, controller/processor 280 includes a repeater component 281, which may be representative of the repeater component 198 of FIG. 1. Notably, while depicted as an aspect of controller/processor 280, the repeater component 281 may be implemented additionally or alternatively in various other aspects of UE 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Overview of Repeaters

Next generation (5$^{th}$ generation (5G)) wireless networks have stated objectives to provide ultra-high data rate and support wide scope of application scenarios. Integrated access and backhaul (IAB) systems have been studied in 3rd generation partnership project (3GPP) as one possible solution to help support these objectives.

In the IAB system, a wireless backhaul solution is adopted to connect cells (IAB-nodes) to a core network (which uses a wired backhaul). Some attractive characteristics of the IAB system are support for multi-hop wireless backhaul, sharing of a same technology (e.g., a new radio (NR)) and resources (e.g., frequency bands) for both access and backhaul links.

There are various possible architectures for the IAB-nodes, including layer-2 (L2) and layer-3 (L3) solutions, and a particular architecture deployed may depend on what layers of protocol stack are implemented in intermediate nodes (IAB-nodes). For example, L2 relays may implement physical (PHY)/medium access control (MAC)/radio link control (RLC) layers.

Certain aspects of the present disclosure relate to L1 relays (referred to as repeaters). L1 relays/repeaters may have many features. For example, such repeaters are relatively simple, low-cost, low-power, and are wirelessly connected to a donor or another relay (e.g., a gNodeB (gNB)).

Figure 4:
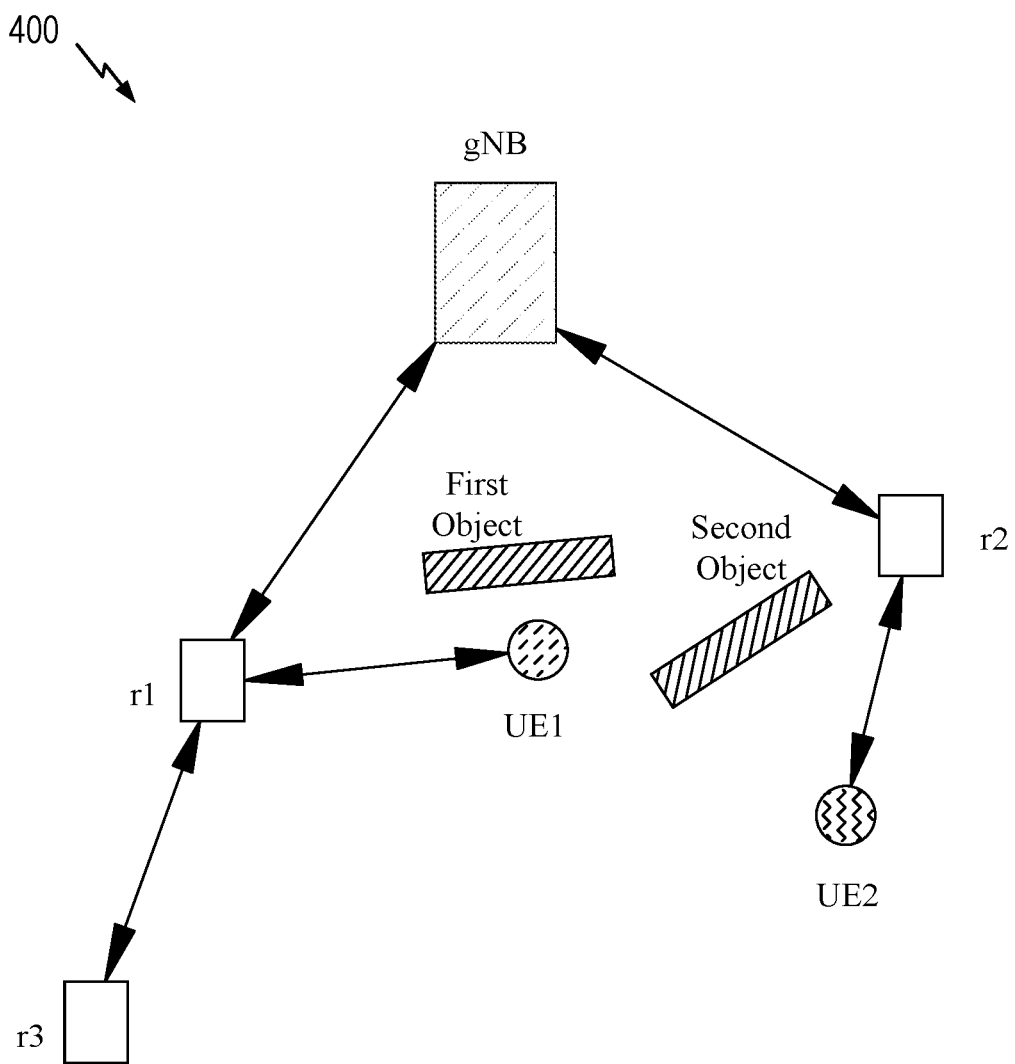
FIG. 4 is a block diagram of an example wireless system deploying repeaters.

FIG. 4 illustrates one example application of how repeaters may be used in a wireless communication system 400 to help improve coverage by overcoming blockage (for instance, obstruction of radio frequency (RF) signals by an object). It is understood that the blockage is a major issue in millimeter wave (MMW) where beamforming is used to send directional RF signals. In the illustrated example, repeaters (e.g., r1, r2, and r3) may allow gNB to serve UEs (e.g., UE1 and UE2) even though objects prevent the gNB directional RF signals from reaching the UEs.

As illustrated, because the r1 is not blocked by the objects, the r1 may receive the RF signals from the gNB and re-transmit the RF signals to reach the UE1 (although the UE1 is blocked by a first object from receiving the RF signals directly from the gNB). Similarly, because the r2 is not blocked by the objects, the r2 may receive the RF signals from the gNB and re-transmit the RF signals to reach the UE2 (although the UE2 is blocked by a second object from receiving the RF signals directly from the gNB). As demonstrated by this example, the repeaters may serve as relatively simple and inexpensive solutions to provide protection against the blockage by the objects, extend the coverage of the MMW cell, and fill coverage holes.

Figure 5:
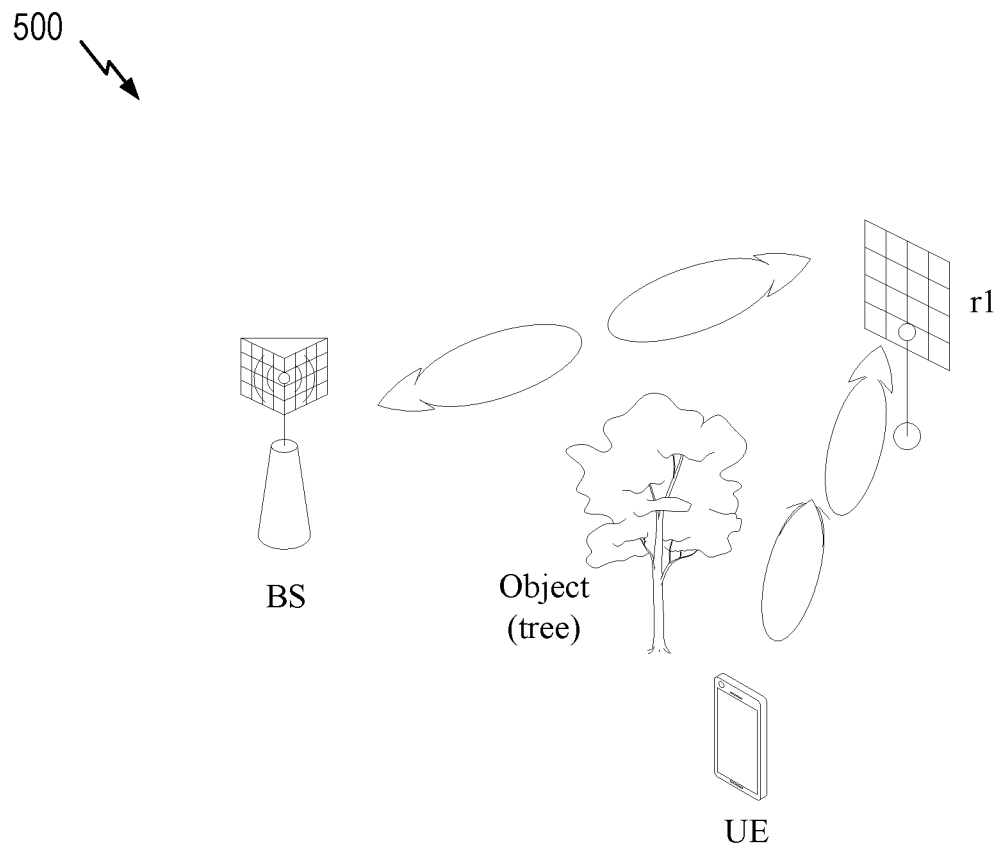
FIG. 5 illustrates an example scenario for deploying repeaters.
Figure 6:
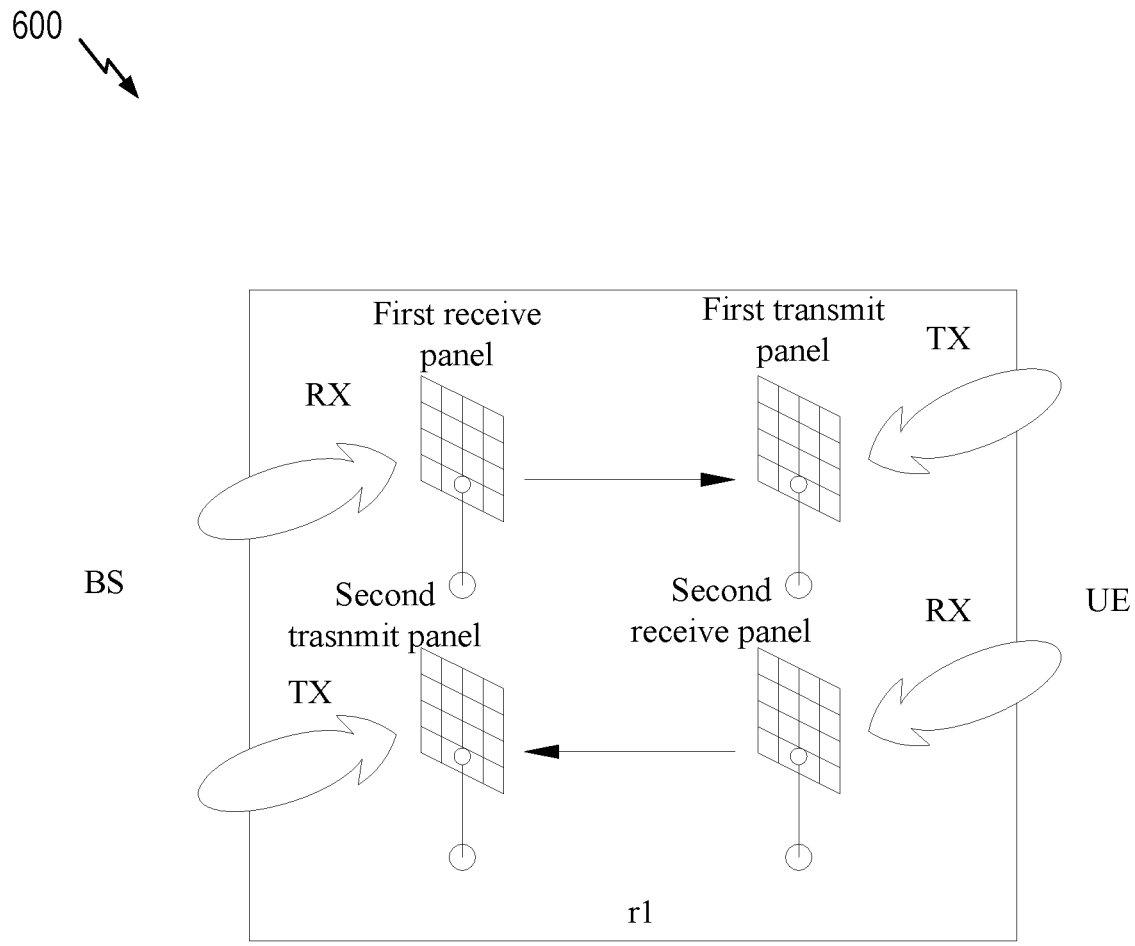
FIG. 6 illustrates an example wireless system deploying repeaters.

FIGS. 5 and 6 provide additional details of how repeaters may help effectively overcome challenge of a blockage by one or more objects. As illustrated in a wireless communication system 500 of FIG. 5, a repeater r1 receives at least one RF signal in one panel (corresponding to a receive or Rx beam) and (re-)transmits the RF signal in another panel (corresponding to a transmit or Tx beam). For example, the repeater r1 simply amplifies the received RF signal and forwards the RF signal to become the transmitted RF signal (amplify-and-forward).

In the example illustrated in FIG. 5, the repeater r1 is able to receive the RF signal (for example, during downlink (DL)) from a BS and relay the RF signal to a UE, which may be blocked from receiving the RF signal directly from the BS due to a presence of an object (e.g., a tree) between the BS and the UE. In other direction (e.g., during uplink (UL)), the repeater r1 may receive the RF signal from the UE and relay the RF signal to the BS.

As illustrated in a wireless communication system 600 of FIG. 6, a repeater r1 may include receive panels (for example, a first receive panel and a second receive panel) and transmit panels (for example, a first transmit panel and a second transmit panel), which may be used to implement fixed beam patterns. For wide coverage, the beam patterns are usually wide, therefore not achieving high array gains. The repeater r1 is typically not aware of whether a signal (e.g., RF signal) is a DL signal or an UL signal in a time division duplex (TDD) system and operates in both directions (full duplex) simultaneously.

Figure 7:
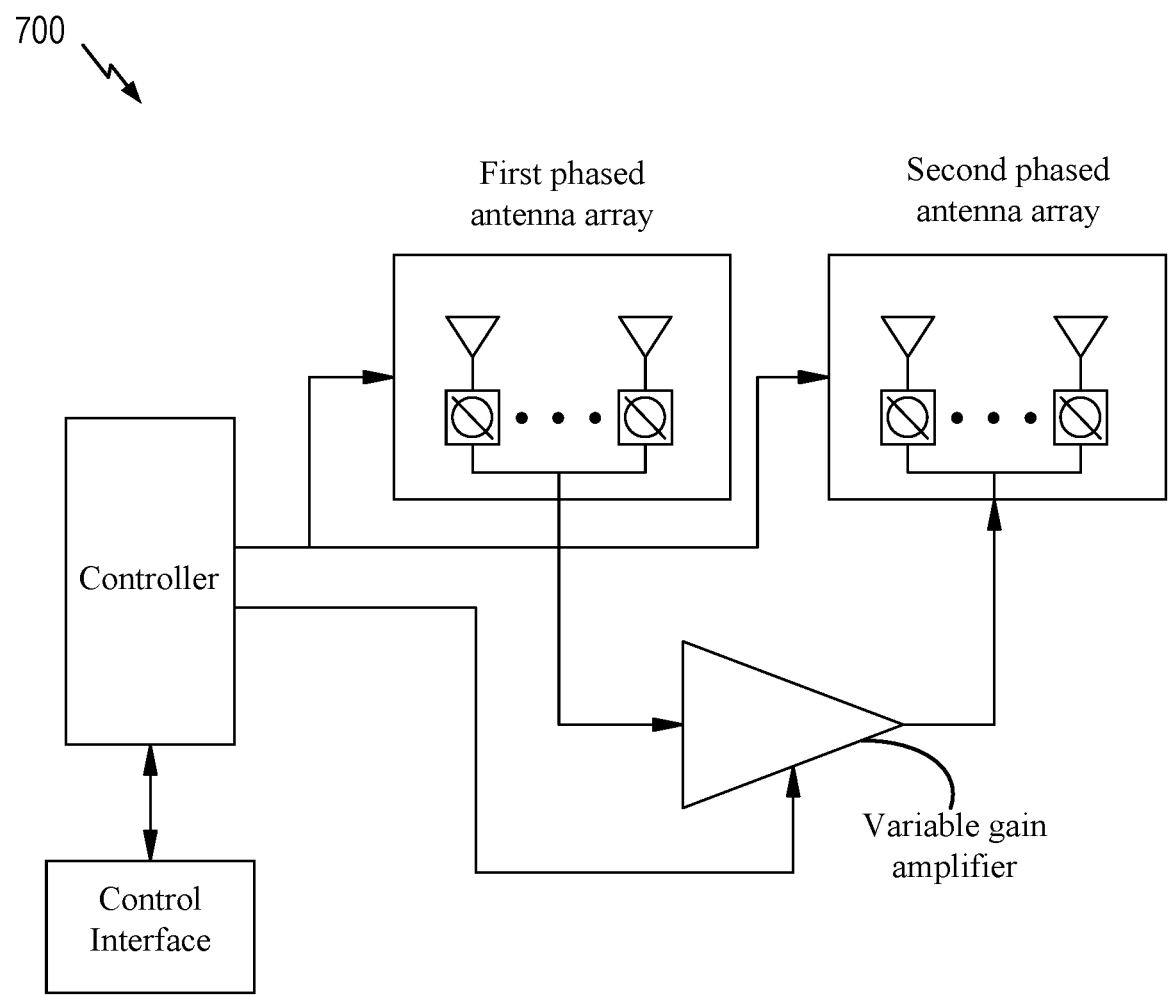
FIG. 7 is a block diagram of an example architecture of a repeater.

FIG. 7 illustrates a schematic view of an example architecture 700 for a repeater (e.g., L1 repeater). As noted above, the repeater may perform operations of receiving an analog RF signal on its receiver (RX) antennas (e.g., based on some configured RX beamforming), amplifying power of the received analog RF signal, and transmitting the amplified analog RF signal from its transmitter (TX) antennas (e.g., based on some configured TX beamforming).

As illustrated in FIG. 7, beamforming may be accomplished via phased antenna arrays (for example, a first phased antenna array and a second phased antenna array) configured by a controller, while the amplification may be accomplished by a variable gain amplifier. The repeater may also communicate some control signals with a server (e.g., a BS serving as a donor, a control node, etc.) via a control interface. The control interface may be implemented out-of-band (e.g., operating outside a carrier frequency on which the RX signal is received) or in-band (e.g., using a smaller bandwidth part of a same carrier frequency). The out-of-band control interface may be implemented, for example, via a separate (e.g. a low-frequency) modem using a different radio technology (for instance, a Bluetooth) or different frequency (for instance, long term evolution (LTE) narrowband—internet of things (NB-IoT)).

As noted above, a repeater may be a relay node with amplify-and-forward operation between two wireless nodes (e.g., a network entity and a UE), and provides a simple and cost-effective way to improve network coverage. Other type of the relay node may be a decode-and-forward relay node, e.g. IAB node. In some cases, a performance of the repeater may be improved based on side information. The side information may include timing information (e.g. a slot, a symbol, a subframe, and a frame boundary), a time division duplex (TDD) UL/DL configuration, ON-OFF scheduling information, and/or spatial information for beam management.

The repeater may be a traditional repeater, an autonomous smart repeater, or a network-controlled repeater. The traditional repeater may operate without the side information to provide the amplify-and-forward operation between the two wireless nodes.

The autonomous smart repeater may either directly or via a cloud-based management entity acquire/infer (at least part of) required information to operate. For example, the autonomous smart repeater may acquire the information by receiving and/or decoding broadcast channels.

The network-controlled repeater may be configured/controlled with the side information by a network node (e.g. gNB) via an established control interface. In one example, all side information may be provided by the gNB. In another example, part of the side information may be configured/controlled by the gNB, while remaining side information may be acquired/infer by the network-controlled repeater itself. This may reduce a control overhead and/or a latency of the network-controlled repeater.

Overview of Mobile Repeaters

In some cases, a repeater may be deployed in a fixed and static location to provide amplify-and-forward operation between two wireless nodes. In some cases, the repeater may be mobile (e.g., deployed in a vehicle such as a bus). A mobile repeater (e.g., in a vehicle) may provide better coverage for some user equipments (UEs) (e.g., for in-vehicle UEs by compensating for a penetration loss). The mobile repeater may also serve the UEs near the vehicle (such as the UEs with pedestrians and in moving cars).

The mobile repeater may be a first type of the mobile repeater or a second type of the mobile repeater. The first type of the mobile repeater may be controlled by a network entity. The second type of the mobile repeater may be an autonomous smart mobile repeater.

In some cases, the first type of the mobile repeater may have a UE modem, which may establish a radio resource control (RRC) connection with the network entity. The modem may also perform radio resource management (RRM) measurements, and report the RRM measurements to a serving cell of the first type of the mobile repeater.

In some cases, the network entity may have information associated with the first type of the mobile repeater. The information may include a type of the mobile repeater, functionality of the mobile repeater, UEs being served by the mobile repeater, a traffic demand of the mobile repeater, and quality of service (QoS) requirements of the mobile repeater.

In some cases, when the first type of the mobile repeater is moving through a network and a hand over has to be performed from a current cell to a target cell, the network entity may decide which target cell to hand over the first type of the mobile repeater (and its associated UEs). The network entity may determine the target cell based on mobile repeater measurements, UEs measurements, UEs requirements, and/or cell loads.

In some cases, the autonomous mobile repeater may operate transparently to the network entity. In some cases, the autonomous mobile repeater may communicate with a cloud-based management entity. In some cases, the autonomous mobile repeater may be self-sufficient to operate.

Aspects Related to Target Cell Selection of Autonomous Mobile Repeaters

Aspects of the present disclosure provide apparatuses, methods, processing systems, and computer-readable mediums for selecting a target cell by a mobile repeater based on side information and/or received broadcast signals, as the repeater moves through a network. The mobile repeater may associate with a selected target cell and, once the association is established, the mobile repeater may forward signals between the target cell and a user equipment (UE).

FIG. 8 depicts a flow diagram illustrating example operations 800 for wireless communication. The operations 800 may be performed, for example, by a mobile repeater. In certain aspects, the mobile repeater may be a UE (e.g., such as the UE 104 in the wireless communication network 100 of FIG. 1). The operations 800 may be implemented as software components that are executed and run on one or more processors (e.g., the controller/processor 280 of FIG. 2). Further, transmission and reception of signals by the mobile repeater in operations 800 may be enabled, for example, by one or more antennas (e.g., the antennas 252 of FIG. 2). In certain aspects, the transmission and/or reception of signals by the mobile repeater may be implemented via a bus interface of one or more processors (e.g., the controller/processor 280) obtaining and/or outputting signals.

The operations 800 begin, at 810, by measuring broadcast signals from one or more target cells as the mobile repeater moves through a network. For example, the mobile repeater may measure the broadcast signals from the one or more target cells using a processor, antenna(s) and/or transceiver components of the UE 104 shown in FIG. 1 or FIG. 2 and/or of the apparatus shown in FIG. 13.

At 820, the mobile repeater selects one of the target cells based on the measuring and side information. The UE may select one of the target cells using a processor, antenna(s) and/or transceiver components of the UE 104 shown in FIG. 1 or FIG. 2 and/or of the apparatus shown in FIG. 13.

At 830, the mobile repeater forwards signals between a UE and the selected target cell. The mobile repeater may forward the signals between the UE and the selected target cell using antenna(s) and transmitter/transceiver components of the UE 104 shown in FIG. 1 or FIG. 2 and/or of the apparatus shown in FIG. 13.

FIG. 9 is a flow diagram illustrating example operations 900 for wireless communication. The operations 900 may be performed, for example, by a network entity such as a cloud-based management entity (e.g., the BS 102 in the wireless communication network 100 of FIG. 1). The operations 900 may be implemented as software components that are executed and run on one or more processors (e.g., the controller/processor 240 of FIG. 2). Further, transmission and reception of signals by the network entity in operations 900 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 900 begin, at block 910, by receiving from a mobile repeater assistance information related to a mobility of the mobile repeater as the mobile repeater moves through a network. For example, the network entity may receive the assistance information related to the mobility of the mobile repeater from the mobile repeater using antenna(s) and receiver/transceiver components of the BS 102 shown in FIG. 1 or FIG. 2 and/or of the apparatus shown in FIG. 14.

At 920, the network entity transmits side information comprising an indication of at least one target cell, based on the assistance information, to the mobile repeater to establish a connection with the at least one target cell. For example, the network entity may send the side information to the mobile repeater using antenna(s) and transmitter/transceiver components of the BS 102 shown in FIG. 1 or FIG. 2 and/or of the apparatus shown in FIG. 14.

Figure 10:
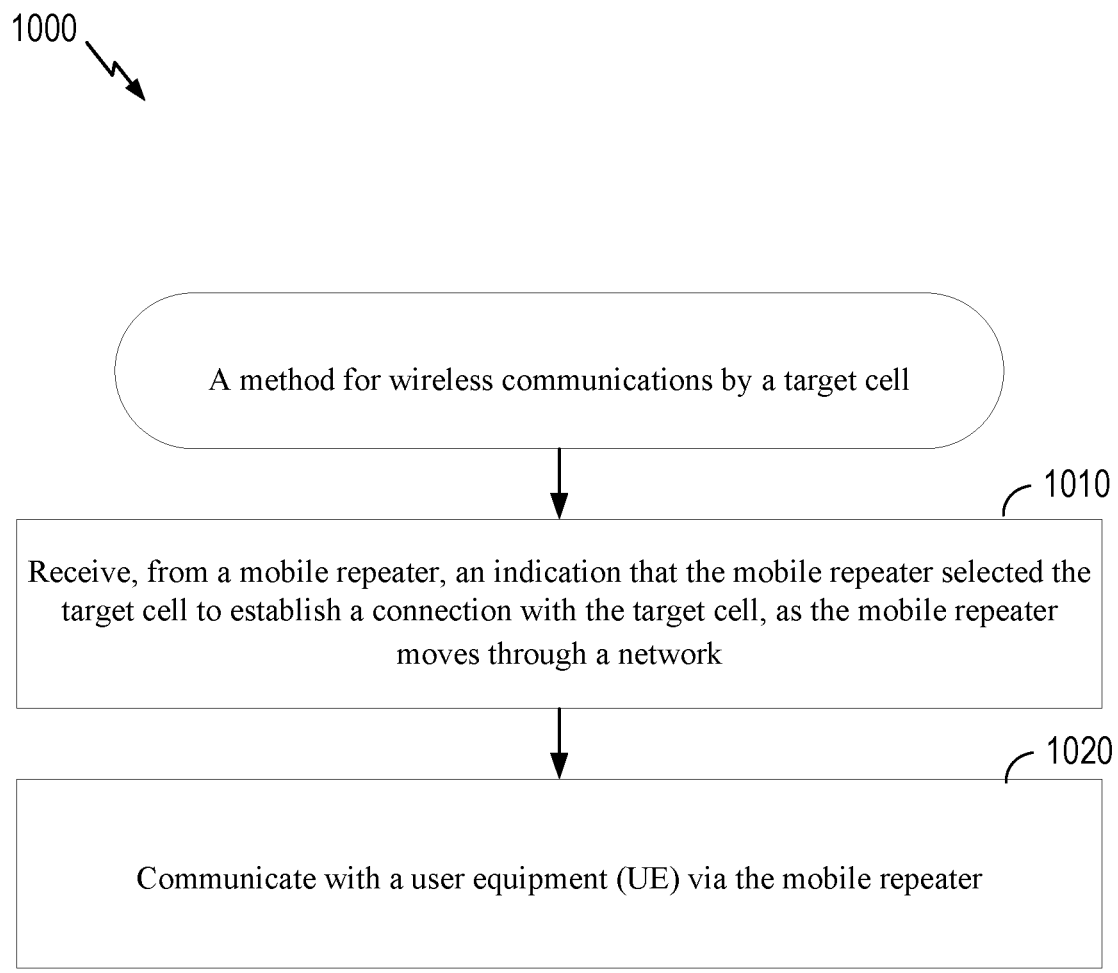
FIG. 10 depicts a flow diagram illustrating example operations for wireless communication by a target cell.

FIG. 10 is a flow diagram illustrating example operations 1000 for wireless communication. The operations 1000 may be performed, for example, by a target cell associated with a network entity (e.g., the BS 102 in the wireless communication network 100 of FIG. 1). The operations 1000 may be implemented as software components that are executed and run on one or more processors (e.g., the controller/processor 240 of FIG. 2). Further, transmission and reception of signals by the target cell in operations 1000 may be enabled, for example, by one or more antennas (e.g., the antennas 234 of FIG. 2). In certain aspects, the transmission and/or reception of signals by the target cell may be implemented via a bus interface of one or more processors (e.g., the controller/processor 240) obtaining and/or outputting signals.

The operations 1000 begin, at block 1010, by receiving from a mobile repeater an indication that the mobile repeater selected the target cell to establish a connection with the target cell as the mobile repeater moves through a network. For example, the network entity may receive the indication from the mobile repeater that the mobile repeater selected the target cell to establish the connection with the target cell using antenna(s) and receiver/transceiver components of the BS 102 shown in FIG. 1 or FIG. 2 and/or of the apparatus shown in FIG. 15.

At 1020, the network entity communicates with a UE via the mobile repeater. For example, the network entity may communicate with the UE via the mobile repeater using a processor, antenna(s) and/or transceiver components of the BS 102 shown in FIG. 1 or FIG. 2 and/or of the apparatus shown in FIG. 15.

Figure 11:
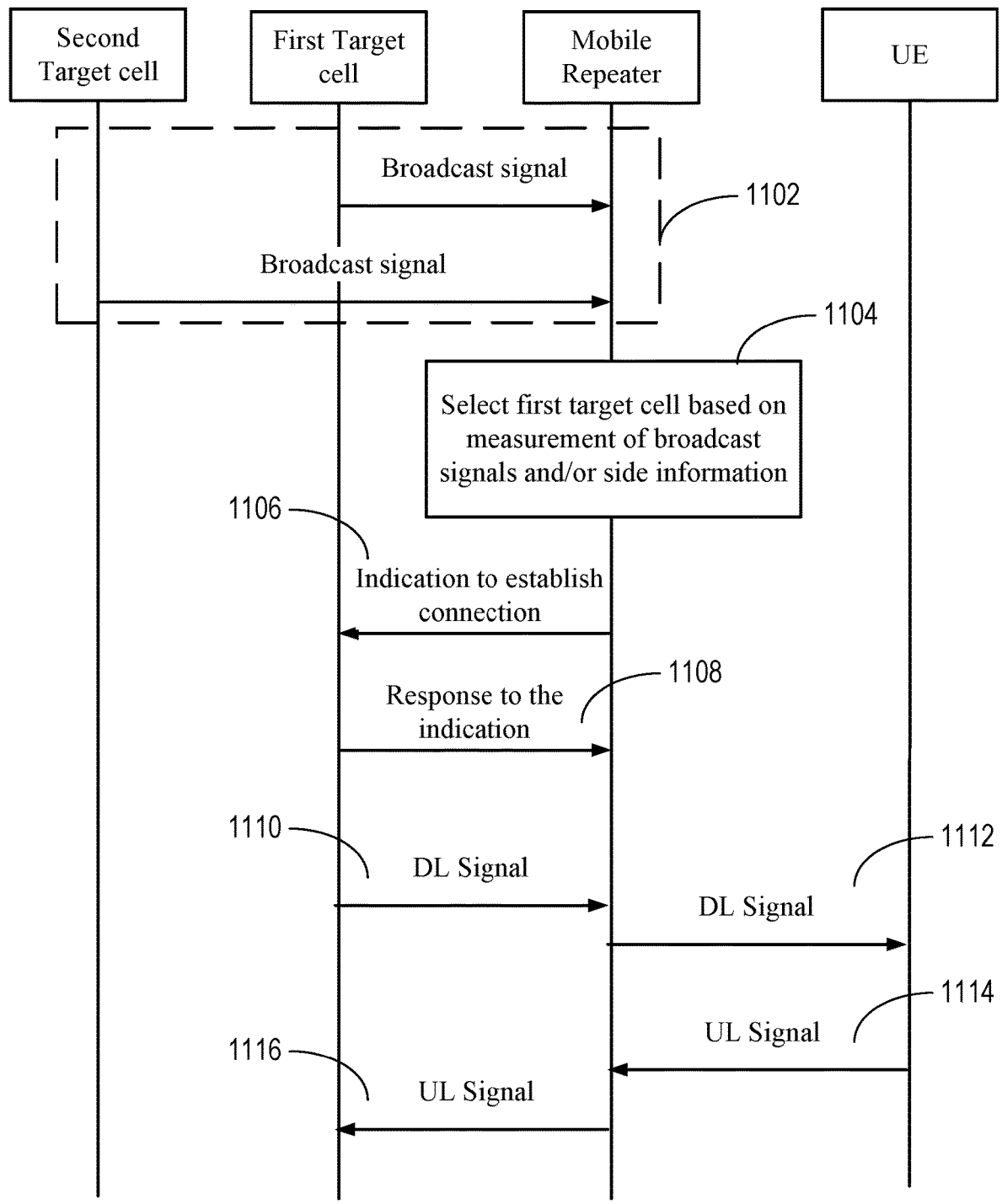
FIG. 11 depicts a call flow diagram illustrating example signaling for wireless communications.
Figure 12:
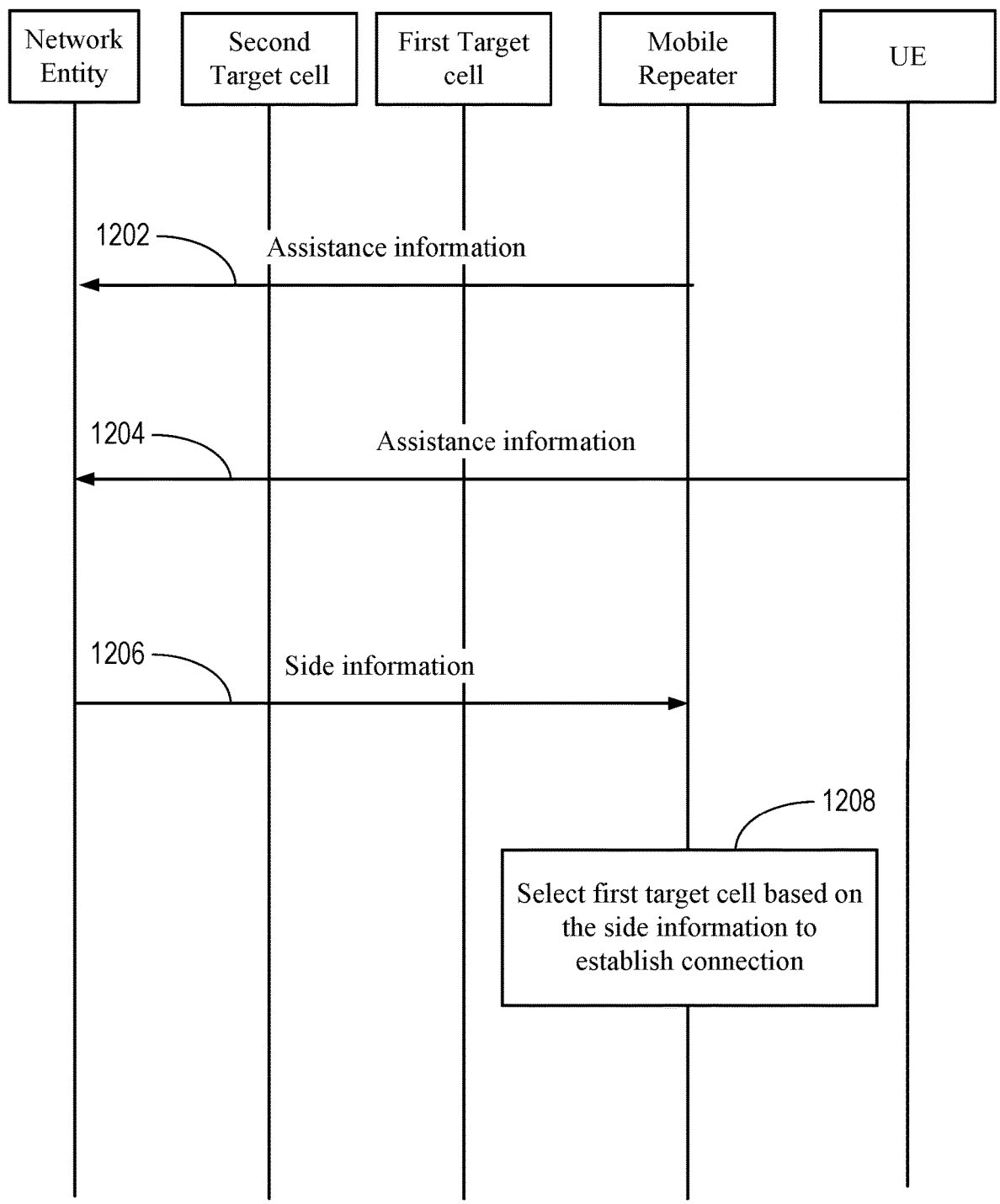
FIG. 12 depicts a call flow diagram illustrating example signaling for wireless communications.

The operations shown in FIGS. 8, 9, and 10 may be understood with reference to the call flow diagrams of FIGS. 11 and 12.

As illustrated in FIG. 11, at 1102, a mobile repeater measures broadcast signals sent from multiple target cells (e.g., as it moves through a network).

In certain aspects, the mobile repeater may be an autonomous smart repeater that operates transparently to a network entity (e.g., a cloud-based management entity). In certain aspects, the autonomous smart repeater may not establish a radio resource control (RRC) connection. Also, the autonomous smart repeater may not perform a handover procedure. In certain aspects, the autonomous smart repeater may connect to the network entity (e.g., via internet protocol (IP) connection) as a UE, while a repeating operation of the autonomous smart repeater is transparent to the network entity.

At 1104, the mobile repeater selects a first target cell based on measurement of the received broadcast signals and/or side information.

In certain aspects, the mobile repeater measures several variables based on the received broadcast signals. In one example, the mobile repeater may measure a reference signal received power (RSRP) based on each received broadcast signal. The mobile repeater may use a temporal variation of measured power (i.e., the RSRPs of the broadcast signals) to select one target cell (which may be closest to the mobile repeater). For example, increasing RSRP (and its rate of increase) may be an indication of whether the mobile repeater is getting close to the target cells (or whether the mobile repeater may be moving towards the target cells or not). The mobile repeater compares measured RSRP for each received broadcast signal with a threshold of the RSRP for target cell selection (received from a network entity), and selects the first target cell based on the comparison.

In another example, the mobile repeater may measure a change in a propagation delay based on each received broadcast signal. The mobile repeater may use a temporal variation of measured received timing (i.e., the change in the propagation delay) for each received broadcast signal to select one target cell. For example, the mobile repeater compares the temporal variation of the measured received timing for each received broadcast signal with a threshold (e.g., the threshold of the change in the propagation delay for target cell selection received from the network entity), and selects the first target cell based on the comparison.

In another example, the mobile repeater may measure and/or estimate a doppler based on each received broadcast signal. The mobile repeater may use estimated doppler for each received broadcast signal to select one target cell. For example, the mobile repeater compares the estimated doppler for each received broadcast signal with a threshold (e.g., the threshold of the doppler for target cell selection received from the network entity), and selects the first target cell based on the comparison.

In certain aspects, the mobile repeater may estimate the side information. For example, the side information includes a relative mobility of the mobile repeater with respect to the first and the second target cells based on the measurement of the received broadcast signals.

In certain aspects, the side information relates to a number of UEs served by the mobile repeater. In some cases, the number of UEs may be determined based on a power of signals transmitted by the UEs to the mobile repeater. In some cases, the number of UEs may be determined based on a number of random access channel (RACH) preambles transmitted by the UEs to the mobile repeater. In one example, the mobile repeater may use rules (that may be preconfigured or indicated by the network entity) to select one target cell. The rules may be dependent on how many UEs are being served through the mobile repeater. In another example, the number of UEs served by the mobile repeater may be known to the mobile repeater through proprietary solutions (e.g., implemented by a fleet owner who manages mobile repeater's operation in a vehicle and the UEs inside the same vehicle). In another example, the number of UEs served by the mobile repeater may be determined based on estimating an amount and an overall time of UE activity. In some cases, the UE activity may be defined as detecting an incoming signal with measured power beyond a threshold. In some cases, the UE activity may be estimated through a number of detected RACH preambles sent by the UEs (and forwarded by the mobile repeater).

In certain aspects, the side information includes access control parameters. The access control parameters may be specified for the mobile repeater (and the UEs being served through the mobile repeater). In one example, the access control parameters may include closed access group (CAG) cells. In another example, the access control parameters may include a list of target cells reserved for other use.

At 1106, the mobile repeater attempts to establish a connection with the first target cell. For example, the mobile repeater sends an indication to the first target cell to establish connection. The indication is conveyed via a message (e.g., RACH message). The RACH message includes a preamble (RACH MSG1 payload or MSG3), which may carry information associated with the mobile repeater.

In one example, the information may include a type of the mobile repeater. In another example, the information may include data corresponding to a mobility of the mobile repeater within the network. In another example, the information may include data corresponding to a direction of the mobile repeater within the network. In another example, the information may include a number of UEs (and their IDs) served by the mobile repeater. In another example, the information may include a traffic load of the mobile repeater based on the number of UEs. In another example, the information may include a capability of the mobile repeater to serve the UEs. In another example, the information may include a configuration of the mobile repeater.

At 1108, the first target cell sends a response to the mobile repeater, in response to the received indication from the mobile repeater.

In one example, the response may include an acceptance of the connection by the mobile repeater. In another example, the response may include a rejection of the connection by the mobile repeater. In another example, the response may include a list of other target cells for establishing the connection. In another example, the response may include a request for additional information from the mobile repeater. In another example, the response may include an indication to establish the connection (if the mobile repeater is capable) so that the network entity can exchange more information/configuration with the mobile repeater.

In certain aspects, when the connection is established between the mobile repeater and the first target cell, the mobile repeater may forward signals between a UE and the first target cell. For example, at 1110, the first target cell sends a DL signal to the mobile repeater, and at 1112, the mobile repeater forwards the DL signal to the UE. Also, when the UE sends an UL signal to the mobile repeater (at 1114), the mobile repeater forwards the UL signal to the first target cell (at 1116).

As illustrated in FIG. 12, at 1202, a mobile repeater sends assistance information to a network entity. The assistance information may include measurement reports related to a mobility of the mobile repeater.

In one example, the network entity may be a cloud-based management entity, and connected to the mobile repeater via internet protocol (IP) connection.

In another example, the network entity may be a network node accessed by the mobile repeater using a different radio access technology (RAT) (e.g., long term evolution (LTE)). In such cases, the mobile repeater may send the assistance information (such as higher-band measurements) to the network entity, using an out-band control interface. Also, in such cases, the network entity may prepare source and target cells for a handover of the associated UEs and/or indicate to the UEs about the outgoing/incoming mobile repeater.

In another example, the network entity may be the network node accessed by the mobile repeater on a different frequency range.

At 1204, a UE sends the assistance information to the network entity. In certain aspects, another network entity (not shown) may also send the assistance information to the network entity.

At 1206, the network entity generates and sends side information to the mobile repeater, based on the received assistance information. In certain aspects, the side information may include an indication of one or more target cells to select.

In certain aspects, the side information may include an itinerary of the mobile repeater and a list of target cells preconfigured for the itinerary. The mobile repeater may move through the network according to the itinerary.

At 1208, the mobile repeater selects a target cell (e.g., a first target cell), based on the side information to establish connection with the first target cell. As noted above, when the connection is established between the mobile repeater and the first target cell, the mobile repeater may forward signals between the UE and the first target cell.

Example Wireless Communication Devices

Figure 13:
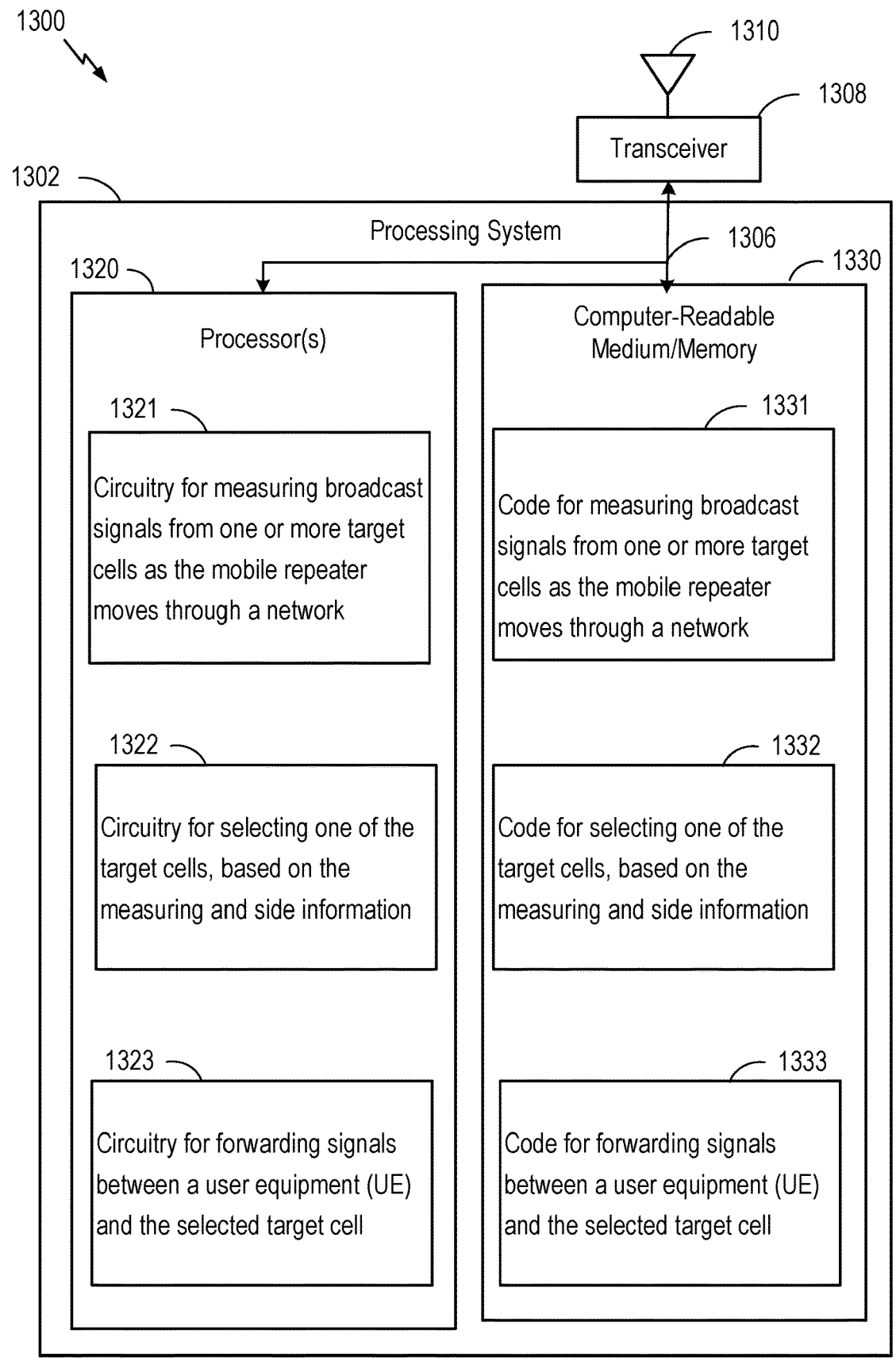
FIGS. 13-15 depict aspects of example communications devices.

FIG. 13 depicts an example communications device 1300 that includes various components operable, configured, or adapted to perform operations for the techniques disclosed herein, such as the operations depicted and described with respect to FIG. 8. In some examples, communication device 1300 may be a mobile repeater (e.g., a user equipment (UE) 104 as described, for example with respect to FIGS. 1 and 2).

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIG. 8, or other operations for performing the various techniques discussed herein.

In the depicted example, computer-readable medium/memory 1330 stores code 1331 for measuring broadcast signals from one or more target cells as the mobile repeater moves through a network, code 1332 for selecting one of the target cells, based on the measuring and side information, and code 1333 for forwarding signals between a UE and the selected target cell.

In the depicted example, the one or more processors 1320 include circuitry configured to implement the code stored in the computer-readable medium/memory 1330, including circuitry 1321 for measuring broadcast signals from one or more target cells as the mobile repeater moves through a network, circuitry 1322 for selecting one of the target cells, based on the measuring and side information, and circuitry 1323 for forwarding signals between a UE and the selected target cell.

Various components of communications device 1300 may provide means for performing the methods described herein, including with respect to FIG. 8.

In some examples, means for transmitting or sending (or means for outputting for transmission) may include the transceivers 254 and/or antenna(s) 252 of the UE 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the UE 104 illustrated in FIG. 2 and/or transceiver 1308 and antenna 1310 of the communication device 1300 in FIG. 13.

In some examples, means for measuring broadcast signals from one or more target cells as the mobile repeater moves through a network, means for selecting one of the target cells, based on the measuring and side information, and means for forwarding signals between a UE and the selected target cell, may include various processing system components, such as: the one or more processors 1320 in FIG. 13, or aspects of the UE 104 depicted in FIG. 2, including receive processor 258, transmit processor 264, TX MIMO processor 266, and/or controller/processor 280 (including repeater component 281).

Notably, FIG. 13 is just use example, and many other examples and configurations of communication device 1300 are possible.

Figure 14:
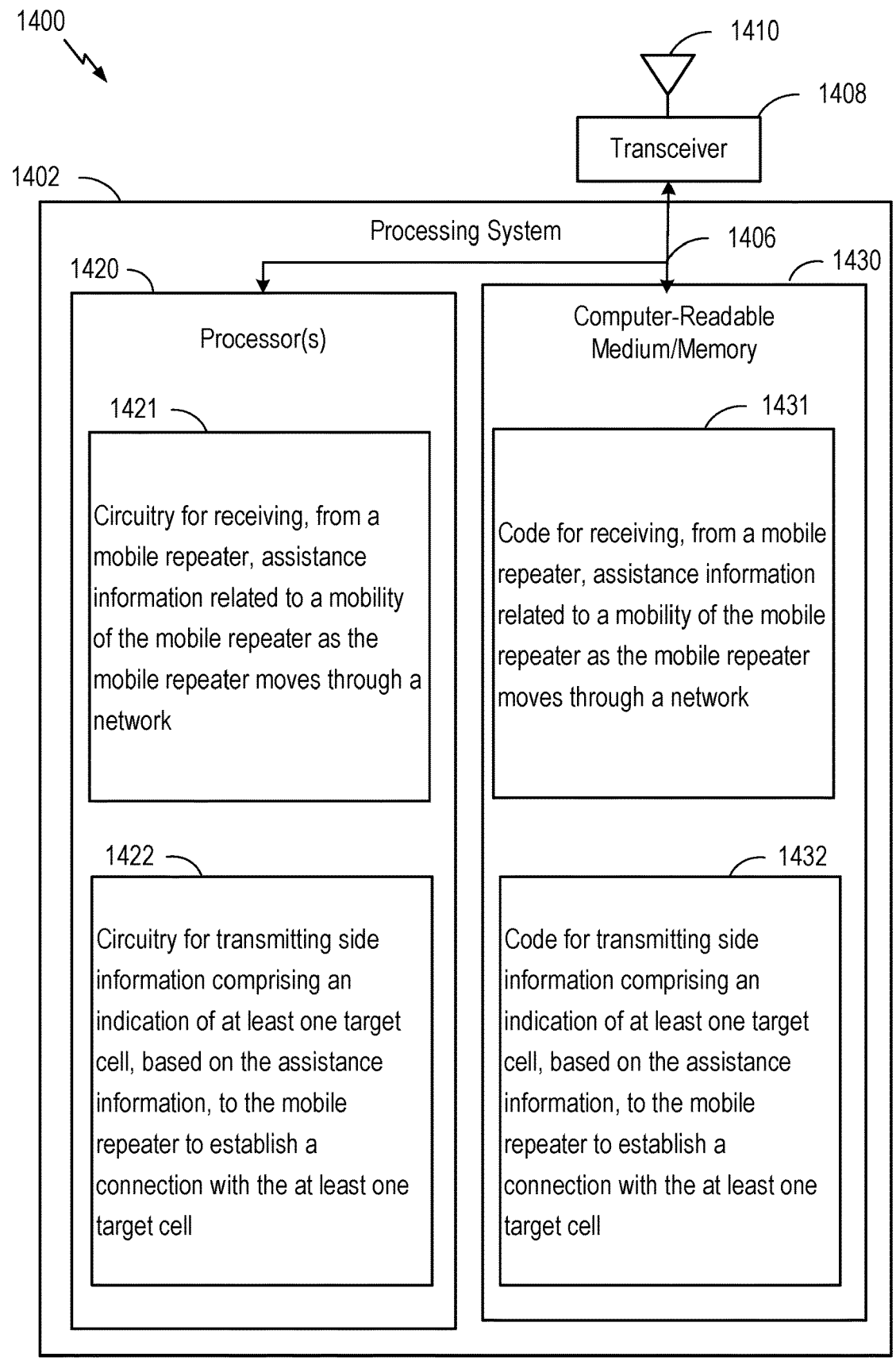

FIG. 14 depicts an example communications device 1400 that includes various components operable, configured, or adapted to perform operations for the techniques disclosed herein, such as the operations depicted and described with respect to FIG. 9. In some examples, communication device 1400 may be a network entity (e.g., a base station (BS) 102 as described, for example with respect to FIGS. 1 and 2).

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIG. 9, or other operations for performing the various techniques discussed herein.

In the depicted example, computer-readable medium/memory 1430 stores code 1431 for receiving from a mobile repeater assistance information related to a mobility of the mobile repeater as the mobile repeater moves through a network, and code 1432 for transmitting side information comprising an indication of at least one target cell based on the assistance information to the mobile repeater to establish a connection with the at least one target cell.

In the depicted example, the one or more processors 1420 include circuitry configured to implement the code stored in the computer-readable medium/memory 1430, including circuitry 1421 for receiving from a mobile repeater assistance information related to a mobility of the mobile repeater as the mobile repeater moves through a network, and circuitry 1422 for transmitting side information comprising an indication of at least one target cell based on the assistance information to the mobile repeater to establish a connection with the at least one target cell.

Various components of communications device 1400 may provide means for performing the methods described herein, including with respect to FIG. 9.

In some examples, means for transmitting or sending (or means for outputting for transmission) may include the transceivers 232 and/or antenna(s) 234 of the BS 102 illustrated in FIG. 2 and/or transceiver 1408 and antenna 1410 of the communication device 1400 in FIG. 14.

In some examples, means for receiving (or means for obtaining) may include the transceivers 232 and/or antenna(s) 234 of the BS 102 illustrated in FIG. 2 and/or transceiver 1408 and antenna 1410 of the communication device 1400 in FIG. 14.

In some examples, means for receiving from a mobile repeater assistance information related to a mobility of the mobile repeater as the mobile repeater moves through a network, and means for transmitting side information comprising an indication of at least one target cell based on the assistance information to the mobile repeater to establish a connection with the at least one target cell, may include various processing system components, such as: the one or more processors 1420 in FIG. 14, or aspects of the BS 102 depicted in FIG. 2, including receive processor 238, transmit processor 220, TX MIMO processor 230, and/or controller/processor 240 (including management entity component 241).

Notably, FIG. 14 is just use example, and many other examples and configurations of communication device 1400 are possible.

Figure 15:
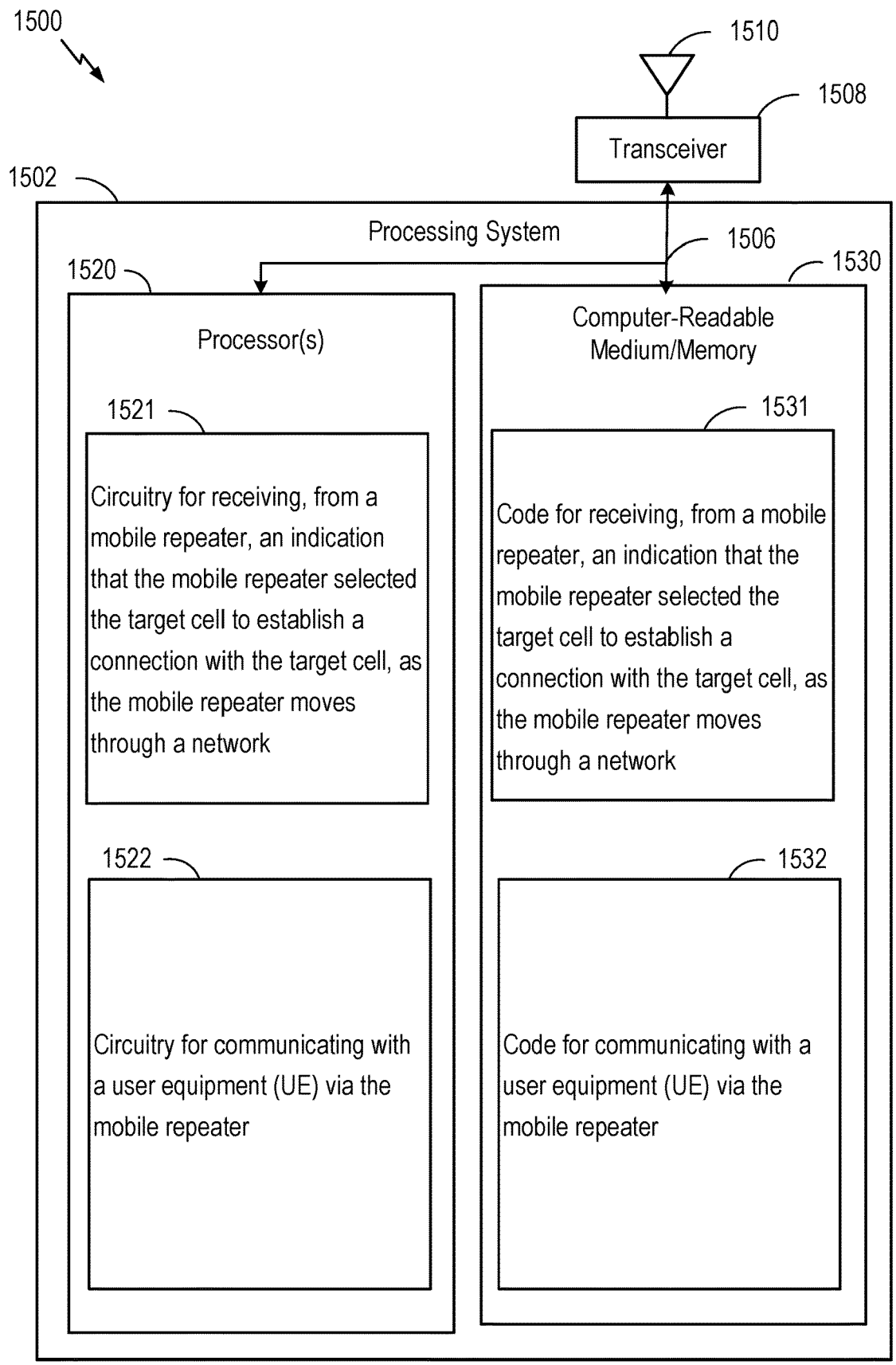

FIG. 15 depicts an example communications device 1500 that includes various components operable, configured, or adapted to perform operations for the techniques disclosed herein, such as the operations depicted and described with respect to FIG. 10. In some examples, communication device 1500 may be a target cell associated with a BS (e.g., a BS 102 as described, for example with respect to FIGS. 1 and 2).

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIG. 10, or other operations for performing the various techniques discussed herein.

In the depicted example, computer-readable medium/memory 1530 stores code 1531 for receiving from a mobile repeater an indication that the mobile repeater selected the target cell to establish a connection with the target cell as the mobile repeater moves through a network, and code 1532 for communicating with a UE via the mobile repeater.

In the depicted example, the one or more processors 1520 include circuitry configured to implement the code stored in the computer-readable medium/memory 1530, including circuitry 1521 for receiving from a mobile repeater an indication that the mobile repeater selected the target cell to establish a connection with the target cell as the mobile repeater moves through a network, and circuitry 1522 for communicating with a UE via the mobile repeater.

Various components of communications device 1500 may provide means for performing the methods described herein, including with respect to FIG. 10.

In some examples, means for transmitting or sending (or means for outputting for transmission) may include the transceivers 232 and/or antenna(s) 234 of the BS 102 illustrated in FIG. 2 and/or transceiver 1508 and antenna 1510 of the communication device 1500 in FIG. 15.

In some examples, means for receiving (or means for obtaining) may include the transceivers 232 and/or antenna(s) 234 of the BS 102 illustrated in FIG. 2 and/or transceiver 1508 and antenna 1510 of the communication device 1500 in FIG. 15.

In some examples, means for receiving from a mobile repeater an indication that the mobile repeater selected the target cell to establish a connection with the target cell as the mobile repeater moves through a network, and means for communicating with a UE via the mobile repeater, may include various processing system components, such as: the one or more processors 1520 in FIG. 15, or aspects of the BS 102 depicted in FIG. 2, including receive processor 238, transmit processor 220, TX MIMO processor 230, and/or controller/processor 240.

Notably, FIG. 15 is just use example, and many other examples and configurations of communication device 1500 are possible.

Example Clauses

Implementation examples are described in the following numbered clauses:

Clause 1: A method for wireless communications by a mobile repeater, comprising: measuring broadcast signals from one or more target cells as the mobile repeater moves through a network; selecting one of the target cells, based on the measuring and side information; and forwarding signals between a user equipment (UE) and the selected target cell.

Clause 2: The method alone or in combination with the first clause, further comprising attempting to establish a connection with the selected target cell, wherein the mobile repeater forwards the signals between the UE and the selected target cell when the connection is established between the mobile repeater and the selected target cell.

Clause 3: The method alone or in combination with one or more of the first and second clauses, further comprising receiving signaling indicating the side information from a network entity.

Clause 4: The method alone or in combination with one or more of the first through third clauses, wherein the measuring comprises measuring at least one of: a reference signal received power (RSRP), a change in a propagation delay, or a doppler based on the broadcast signals from the one or more target cells.

Clause 5: The method alone or in combination with one or more of the first through fourth clauses, wherein the side information comprises a relative mobility of the mobile repeater with respect to the one or more target cells, estimated based on the measuring.

Clause 6: The method alone or in combination with one or more of the first through fifth clauses, further comprising receiving signaling indicating thresholds of the RSRP, the change in the propagation delay, and the doppler for selecting one of the target cells from a network entity.

Clause 7: The method alone or in combination with one or more of the first through sixth clauses, wherein: the mobile repeater moves through the network according to an itinerary; and the side information comprises a list of target cells preconfigured for the itinerary.

Clause 8: The method alone or in combination with one or more of the first through seventh clauses, further comprising transmitting, to a network entity, assistance information related to a mobility of the mobile repeater.

Clause 9: The method alone or in combination with one or more of the first through eighth clauses, wherein the side information comprises an indication of the one or more target cells, received from the network entity, after in response to transmitting the assistance information.

Clause 10: The method alone or in combination with one or more of the first through ninth clauses, wherein the network entity is either a cloud-based management entity connected to the mobile repeater via an internet protocol (IP) connection or a network node accessed by the mobile repeater using a different radio access technology (RAT) or on a different frequency range.

Clause 11: The method alone or in combination with one or more of the first through tenth clauses, wherein the side information relates to a number of UEs served by the mobile repeater.

Clause 12: The method alone or in combination with one or more of the first through eleventh clauses, wherein the number of UEs is determined based on at least one of: a power of signals transmitted by the UEs; or a number of random access channel (RACH) preambles transmitted by the UEs.

Clause 13: The method alone or in combination with one or more of the first through twelfth clauses, wherein the side information comprises access control parameters for the mobile repeater.

Clause 14: The method alone or in combination with one or more of the first through thirteenth clauses, wherein attempting to establish a connection with the selected target cell comprises transmitting an indication to the selected target that the mobile repeater selected the target cell.

Clause 15: The method alone or in combination with one or more of the first through fourteenth clauses, wherein the indication is conveyed via a random access channel (RACH) message.

Clause 16: The method alone or in combination with one or more of the first through fifteenth clauses, wherein the indication indicates one or more of: a type of the mobile repeater, information corresponding to a mobility and a direction of the mobile repeater within the network, a number of UEs served by the mobile repeater, a traffic load of the mobile repeater based on the number of UEs, a capability of the mobile repeater, or a configuration of the mobile repeater.

Clause 17: The method alone or in combination with one or more of the first through sixteenth clauses, further comprising, after transmitting the indication, monitoring for a response from the selected target cell, wherein the response indicates at least one of: an acceptance or a rejection of the connection by the mobile repeater, a list of other target cells for establishing the connection, a request for additional information from the mobile repeater, or an indication to establish the connection.

Clause 18: The method alone or in combination with one or more of the first through seventeenth clauses, wherein the mobile repeater is an autonomous smart repeater and is configured to at least one of: operate transparently to a network entity, not establish a radio resource control (RRC) connection, not perform a handover procedure, or connect to the network entity as a UE, while a repeating operation of the mobile repeater is transparent to the network entity.

Clause 19: A method for wireless communications by a network entity, comprising: receiving, from a mobile repeater, assistance information related to a mobility of the mobile repeater as the mobile repeater moves through a network; and transmitting side information comprising an indication of at least one target cell, based on the assistance information, to the mobile repeater to establish a connection with the at least one target cell.

Clause 20: The method alone or in combination with the nineteenth clause, further comprising establishing a connection with the mobile repeater via an internet protocol (IP) connection when the network entity corresponds to a cloud-based management entity.

Clause 21: The method alone or in combination with one or more of the nineteenth and twentieth clauses, further comprising receiving the assistance information from at least one of: a user equipment (UE) or other network entity.

Clause 22: The method alone or in combination with one or more of the nineteenth through twenty-first clauses, further comprising establishing a connection with the mobile repeater via a different radio access technology (RAT) or on a different frequency range when the network entity corresponds to a network node.

Clause 23: A method for wireless communications by a target cell, comprising: receiving, from a mobile repeater, an indication that the mobile repeater selected the target cell to establish a connection with the target cell, as the mobile repeater moves through a network; and communicating with a user equipment (UE) via the mobile repeater.

Clause 24: The method alone or in combination with the twenty-third clause, further comprising transmitting a response to the mobile repeater based on the received indication, wherein the response indicates at least one of: an acceptance or a rejection of the connection by the mobile repeater, a list of other target cells for establishing the connection, a request for additional information from the mobile repeater, or an indication to establish the connection.

Clause 25: The method alone or in combination with one or more of the twenty-third and twenty-fourth clauses, wherein the indication is received via a random access channel (RACH) message.

Clause 26: The method alone or in combination with one or more of the twenty-third through twenty-fifth clauses, wherein the indication indicates one or more of: a type of the mobile repeater, information corresponding to a mobility and a direction of the mobile repeater within the network, a number of UEs served by the mobile repeater, a traffic load of the mobile repeater based on the number of UEs, a capability of the mobile repeater, or a configuration of the mobile repeater.

Clause 27: An apparatus, comprising: a memory comprising executable instructions; one or more processors configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by one or more processors of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-TRAN) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between BSs 102 and, for example, UEs 104, may be through one or more carriers. For example, BSs 102 and UEs 104 may use spectrum up to YMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the UL, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the UL signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of target cell selection of autonomous mobile repeaters in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications by a mobile repeater, comprising:
   one or more memories comprising instructions; and
   one or more processors configured to execute the instructions and cause the mobile repeater to:
      measure broadcast signals from one or more target cells as the mobile repeater moves through a network based on a change in a propagation delay of the broadcast signals;
      determine a number of user equipments (UEs) served by the mobile repeater based on a power of signals transmitted by UEs to the mobile repeater;
      select one of the target cells, based on measurements of the broadcast signals and side information comprising at least the number of UEs served by the mobile repeater; and
      forward signals between a UE and the selected target cell.

2. The apparatus of claim 1, wherein the one or more processors are configured to execute the instructions and cause the mobile repeater to attempt to establish a connection with the selected target cell, wherein the mobile repeater forwards the signals between the UE and the selected target cell when the connection is established between the mobile repeater and the selected target cell.

3. The apparatus of claim 1, wherein the one or more processors are configured to execute the instructions and cause the mobile repeater to receive signaling indicating the side information from a network entity.

4. The apparatus of claim 1, wherein the one or more processors are configured to execute the instructions and cause the mobile repeater to measure at least one of: a reference signal received power (RSRP), or a doppler based on the broadcast signals from the one or more target cells.

5. The apparatus of claim 4, wherein the side information further comprises a relative mobility of the mobile repeater with respect to the one or more target cells, estimated based on the broadcast signals.

6. The apparatus of claim 4, wherein the one or more processors are configured to execute the instructions and cause the mobile repeater to receive signaling indicating thresholds of the RSRP, the change in the propagation delay, and the doppler for selecting one of the target cells from a network entity.

7. The apparatus of claim 1, wherein:
the mobile repeater moves through the network according to an itinerary; and
the side information further comprises a list of target cells preconfigured for the itinerary.

8. The apparatus of claim 1, wherein the one or more processors are configured to execute the instructions and cause the mobile repeater to transmit, to a network entity, assistance information related to a mobility of the mobile repeater.

9. The apparatus of claim 8, wherein the side information further comprises an indication of the one or more target cells, received from the network entity, after transmission of the assistance information.

10. The apparatus of claim 8, wherein the network entity is either a cloud-based management entity connected to the mobile repeater via an internet protocol (IP) connection or a network node accessed by the mobile repeater using a different radio access technology (RAT) or on a different frequency range.

11. The apparatus of claim 1, wherein the number of UEs is further determined based on a number of random access channel (RACH) preambles transmitted by the UEs.

12. The apparatus of claim 1, wherein the side information further comprises access control parameters for the mobile repeater.

13. The apparatus of claim 1, wherein the one or more processors are configured to execute the instructions and cause the mobile repeater to attempt to establish a connection with the selected target cell by transmitting an indication to the selected target cell that the mobile repeater selected the target cell.

14. The apparatus of claim 13, wherein the indication is conveyed via a random access channel (RACH) message.

15. The apparatus of claim 13, wherein the indication indicates:
a type of the mobile repeater,
information corresponding to a mobility and a direction of the mobile repeater within the network,
a number of UEs served by the mobile repeater,
a traffic load of the mobile repeater based on the number of UEs,
a capability of the mobile repeater, and
a configuration of the mobile repeater.

16. The apparatus of claim 13, wherein the one or more processors are configured to execute the instructions and cause the mobile repeater to, after transmitting the indication, monitor for a response from the selected target cell, wherein the response indicates:
an acceptance or a rejection of the connection by the mobile repeater,
a list of other target cells for establishing the connection,
a request for additional information from the mobile repeater, and
an indication to establish the connection.

17. The apparatus of claim 1, wherein the mobile repeater is an autonomous smart repeater and is configured to at least one of:
operate transparently to a network entity,
not establish a radio resource control (RRC) connection, or
connect to the network entity as a UE, while a repeating operation of the mobile repeater is transparent to the network entity.

18. An apparatus for wireless communications by a target cell, comprising:
one or more memories comprising instructions; and
one or more processors configured to execute the instructions and cause the target cell to:
receive, from a mobile repeater, an indication that the mobile repeater selected the target cell to establish a connection with the target cell, as the mobile repeater moves through a network;
transmit a response to the mobile repeater indicating at least an acceptance or a rejection of the connection by the mobile repeater and a list of other target cells for establishing the connection; and
communicate with a user equipment (UE) via the mobile repeater.

19. The apparatus of claim 18, wherein the one or more processors are configured to execute the instructions and cause the target cell to transmit the response to the mobile repeater based on the received indication, wherein the response indicates:
a request for additional information from the mobile repeater, and
an indication to establish the connection.

20. The apparatus of claim 18, wherein the indication is received via a random access channel (RACH) message.

21. The apparatus of claim 18, wherein the indication indicates:
a type of the mobile repeater,
information corresponding to a mobility and a direction of the mobile repeater within the network,
a number of UEs served by the mobile repeater,
a traffic load of the mobile repeater based on the number of UEs,
a capability of the mobile repeater, and
a configuration of the mobile repeater.

22. A method for wireless communications by a mobile repeater, comprising:
measuring a change in a propagation delay of broadcast signals from one or more target cells as the mobile repeater moves through a network;
determining a number of user equipments (UEs) served by the mobile repeater based on a power of signals transmitted by the UEs to the mobile repeater;
selecting one of the target cells, based on the measuring and side information comprising at least the number of UEs served by the mobile repeater; and
forwarding signals between a UE and the selected target cell.

23. The method of claim 22, further comprising attempting to establish a connection with the selected target cell, and forward the signals between the UE and the selected target cell when the connection is established between the mobile repeater and the selected target cell.

24. The method of claim 22, further comprising receiving signaling indicating the side information from a network entity.

25. The method of claim 22, further comprising measuring the broadcast signals by measuring at least one of: a reference signal received power (RSRP), or a doppler based on the broadcast signals from the one or more target cells, and wherein the side information comprises a relative mobility of the mobile repeater with respect to the one or more target cells, estimated based on measurements of the broadcast signals.

* * * * *